United States Patent
Shuman et al.

(10) Patent No.: US 8,346,211 B2
(45) Date of Patent: Jan. 1, 2013

(54) REDUCING LATENCY IN A PREPAID GROUP COMMUNICATION SESSION WITHIN A WIRELESS COMMUNICATIONS SYSTEM

(75) Inventors: Mohammed Ataur Rahman Shuman, San Diego, CA (US); Mark Maggenti, Del Mar, CA (US); Ashutosh Aggarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 12/501,992

(22) Filed: Jul. 13, 2009

(65) Prior Publication Data

US 2010/0015945 A1    Jan. 21, 2010

Related U.S. Application Data

(60) Provisional application No. 61/080,946, filed on Jul. 15, 2008.

(51) Int. Cl.
*H04M 11/00* (2006.01)
(52) U.S. Cl. ........ 455/406; 455/405; 455/407; 455/410; 455/408; 455/415
(58) Field of Classification Search .................. 455/408, 455/409, 406, 405, 407, 410, 411, 414.1, 455/415, 416, 417; 379/114.2, 112, 115, 379/144
See application file for complete search history.

(56) References Cited

U.S. PATENT DOCUMENTS

| 5,828,743 | A | * | 10/1998 | Pinnell et al. ............ 379/204.01 |
| 6,453,029 | B1 | * | 9/2002 | Campbell .................. 379/114.2 |
| 7,092,697 | B1 | * | 8/2006 | Kupsh et al. ................... 455/406 |
| 2005/0089046 | A1 | | 4/2005 | Moussa et al. |
| 2005/0287982 | A1 | | 12/2005 | Brewer et al. |
| 2006/0003734 | A1 | * | 1/2006 | Vallinen et al. ............... 455/406 |
| 2008/0219421 | A1 | * | 9/2008 | Enriquez .................. 379/114.21 |
| 2008/0299967 | A1 | * | 12/2008 | Kazmi ........................ 455/433 |

FOREIGN PATENT DOCUMENTS

EP    1835710    9/2007

OTHER PUBLICATIONS

International Search Report, PCT/US2009/050746, International Searching Authority, European Patent Office, Dec. 14, 2009.
Written Opinion, PCT/US2009/050746, International Searching Authority, European Patent Office, Dec. 14, 2009.

* cited by examiner

*Primary Examiner* — Kathy Wang-Hurst
(74) *Attorney, Agent, or Firm* — Raphael Freiwirth

(57) ABSTRACT

Embodiments are directed to managing a prepaid server-arbitrated group communication session within a wireless communications system. A server receives, from a session originator, a request to setup a prepaid group communication session with at least one session target, the prepaid group communication session requiring each session participant to have an available prepaid account balance above a threshold level. The server sends a query to an online charging system to determine whether at least the session originator has a prepaid account with an available balance at least equal to the threshold level. The server initiates setup of the requested prepaid group communication session without waiting to receive a response to the query, thereby reducing latency associated with set-up of the prepaid group communication session.

26 Claims, 4 Drawing Sheets

REDUCING LATENCY IN A PREPAID GROUP COMMUNICATION SESSION WITHIN A WIRELESS COMMUNICATIONS SYSTEM

CLAIM OF PRIORITY UNDER 35 U.S.C. §119

The present Application for Patent claims priority to Provisional Application No. 61/080,946 entitled "SYSTEM AND METHOD FOR REDUCING LATENCY IN A PREPAID GROUP COMMUNICATION FROM A WIRELESS COMMUNICATION DEVICE" filed on Jul. 15, 2008 which is incorporated herein by reference in its entirety.

BACKGROUND OF THE INVENTION

1. Field of the Invention

Embodiments of the present invention relate to reducing latency of prepaid group communication sessions within a wireless communications system.

2. Description of the Related Art

In wireless telecommunication devices, such as cellular phones, PDAs, mini-laptops, and advanced pagers, the devices typically communicate over long distances by bridging telephone calls through existing cellular telephone networks and passing data packets across the network. These wireless devices often have limited to significant data processing and computing capability, and can accordingly send and receive software programs, in addition to voice, across the telephone network.

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions. In some arrangements, the PTT speaker will have the "floor" where no other group member can speak while the speaker is speaking. Once the speaker or floorholder releases the PTT button, any other individual member of the group can engage their PTT button and they will have the floor.

There also exist "pre-pay" service plans for wireless devices. Where a customer chooses such a plan, the customer puts money into their account, and that account is debited according to the user's service usage. When such a customer attempts to place a call, many time-consuming steps are executed before the call goes through. The application server that the wireless device communicates with receives a call initiation trigger from the wireless device and then queries an online charging system (OCS). The OCS checks the user's available balance, and if the user has a sufficient balance, the OCS sends an indication to the application server that the user is permitted make the call. The application server then forwards the call invitation (e.g., announce message) to the target user's communications device.

Accordingly, the application server waits to receive the authorization and available balance for the originator of the call before attempting to bring the target user into the call by sending the invite to the target user's wireless communication device. The verification of the originator's ability to pay for the call adds extra processing delays as well as delays due to message exchanges between the application server and the online charge server in the call setup procedure for the call. This increases initial call setup latency and initial media latency for such a pre-pay customer.

While call setup is slightly delayed due to the verification procedure in pre-paid communication sessions, most communication sessions do not undergo significant performance degradation due to such delays. However, such delays may be less acceptable in delay-sensitive communications (e.g., PTT sessions, etc.). Thus, the experience of a pre-paid PTT customer may be degraded due to call setup delays associated with the above-noted verification procedure.

SUMMARY

Embodiments are directed to managing a prepaid server-arbitrated group communication session within a wireless communications system. A server receives, from a session originator, a request to setup a prepaid group communication session with at least one session target, the prepaid group communication session requiring each session participant to have an available prepaid account balance above a threshold level. The server sends a query to an online charging system to determine whether at least the session originator has a prepaid account with an available balance at least equal to the threshold level. The server initiates setup of the requested prepaid group communication session without waiting to receive a response to the query, thereby reducing latency associated with set-up of the prepaid group communication session.

DETAILED DESCRIPTION

Figure 1:
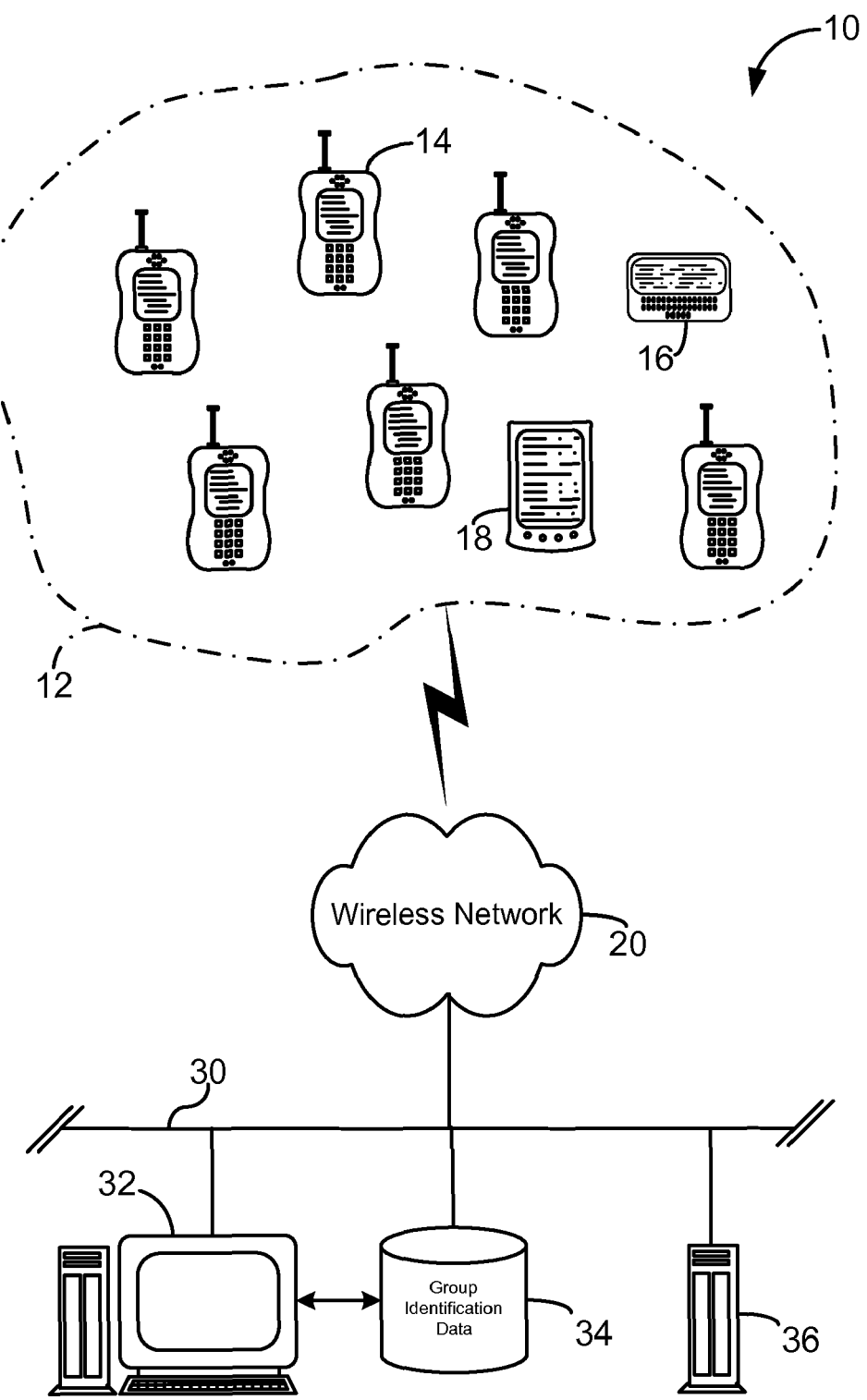
FIG. 1 is a representative diagram of a wireless network with a designated group of wireless telecommunication devices communicating with a application server and other computer devices across the wireless network, shown here as a PTT group.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

In this description, the terms "communication device," "wireless device," "wireless communications device," "PTT communication device," "handheld device," "mobile device," and "handset" are used interchangeably. The terms "call" and "communication" are also used interchangeably. A "group communication" is intended to encompass any communication that requires a fast setup, with low latency, such a half-duplex push-to-talk voice call, data call or other communication such as a full duplex VoIP call and Video or other teleconferencing, the group communication can also be point-to-point, e.g. one to one, or one-to-multipoint, e.g. one to many. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Furthermore, in embodiments described below, a system (e.g., system 10 in FIG. 1) is shown here in several embodiments as operating in a CDMA2000 network architecture. Reference can be had to the known standards and construction of CDMA2000 systems and network interfaces as would be known to one of skill in the art. Other telecommunication standards, such as CDMA2000 Evolution Data-Optimized (EvDO) or IMT-2000, UMTS, or GSM can likewise be used in implementation of the present system 10.

With reference to the figures in which like numerals represent like elements throughout, FIG. 1 illustrates one embodiment of a system 10 with a application server 32 and one or more wireless telecommunication devices in a communication group 12, such as wireless telephone 14, smart pager 16, and personal digital assistant (PDA) 18, that communicate with other wireless telecommunication devices across a wireless network 20. In the system 10, each wireless telecommunication device 14, 16, 18 is capable of selectively and directly communicating across the wireless communication network 20 with a target set of one or more other wireless telecommunication devices. For example, the target set for mobile telephone 14 can be all devices in the communication group 12 or a subset thereof, such as pager 16 and/or PDA 18.

In this embodiment, the wireless telecommunication device (such as mobile telephone 14) notifies the group communication computer device, shown here as application server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share the information with other computer devices resident on the server-side LAN 30 or accessible across the wireless network 20. The group communication computer device 32 can have an attached or accessible database 34 to store the group identification data for the wireless devices.

As is more fully described herein, also shown on the server-side LAN 30 is an online charging system 36 that is configured to maintain user prepaid account data for prepaid accounts, such as prepaid group communications. The user can be charged for the specific airtime while the group communications are established, can be charged a flat rate for each group communication, and/or can be charged in other manners for prepaid group communication services. It should be appreciated that the number of computer components resident on server-side LAN 30, or across the wireless network 20, or Internet generally, are not limited. Moreover, the application server 32 can also include the functionality of the online charging system 36.

In an example, the group communication, such as a PTT communication, can be established through a half-duplex channel between the communicating wireless telecommunication device 14, 16, 18 and the one or more other wireless telecommunication devices of the target set of devices. While embodiments of the invention are described as generally being directed to half-duplex communication sessions, it will be readily apparent that other embodiments can be directed to any server-arbitrated communication session, including full-duplex communication sessions (e.g., VoIP, etc.). Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14, 16, 18 of the inability to bridge a direct communication to the target set 12 if one or more of the wireless telecommunication devices of the target set have not informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

The group communication can be voice, applications, graphic media, such as pictures in JPEG, TIF, and the like, or audio files such as MP3, MP4, WAV, and the like. The media can also be video or streaming media, such as a multimedia application (PowerPoint, MOV file, and the like). Also, in an example, the group communication session can correspond to a half-duplex audio conference among members of the communication group 12. As will be appreciated, in this type of group communication session, the speed of the connection and the quality of media delivery (e.g., voice data) are important to maintain Quality of Service (QoS) to the end-user(s).

Figure 2:
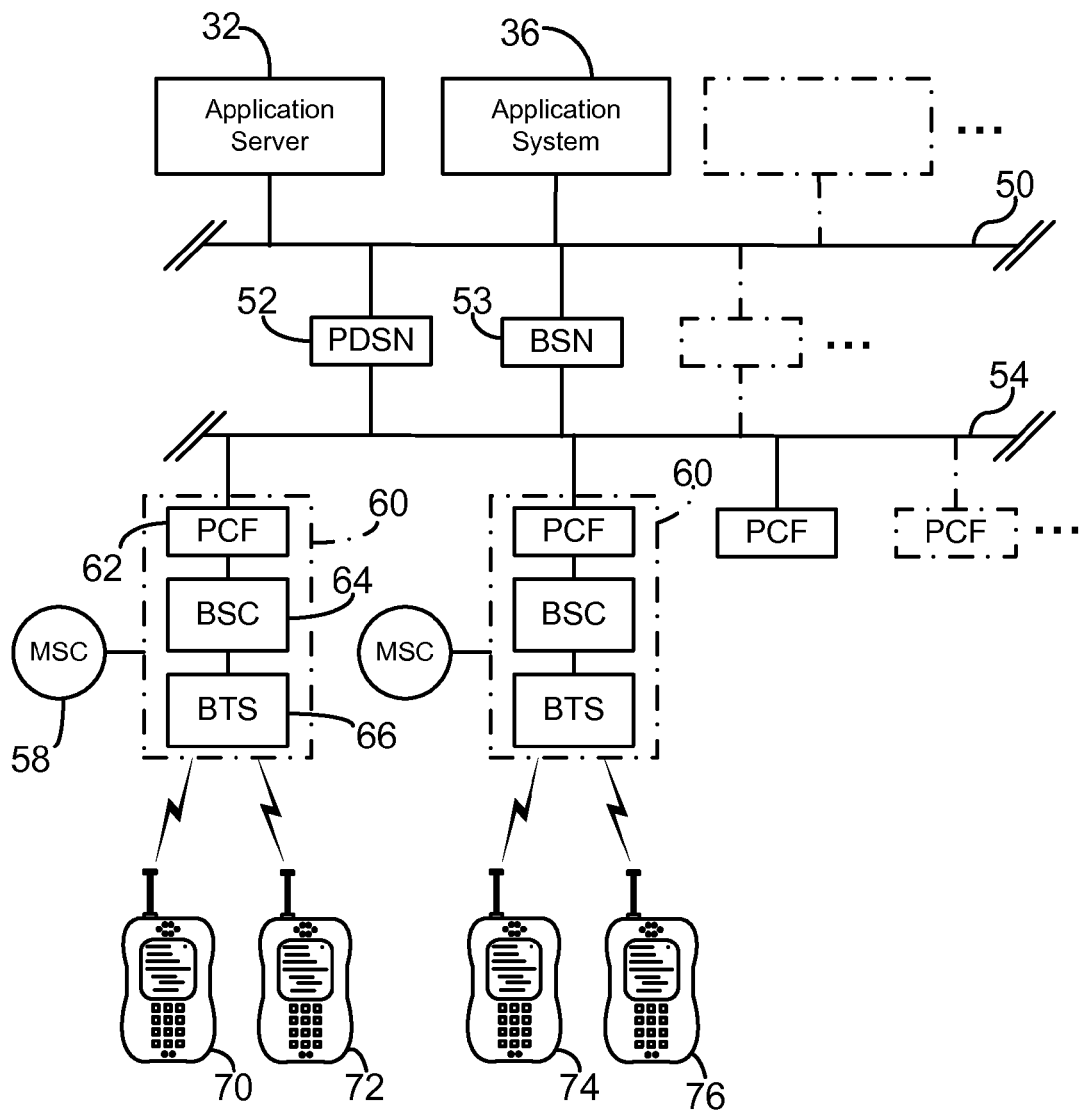
FIG. 2 is a representative diagram of one embodiment of a wireless network in a common cellular telecommunication configuration, having an application server control group communications, to include prepaid group communications, between the wireless telecommunication devices of PTT group members, and an online charging system for the prepaid group communications.

FIG. 2 is a representative diagram of one embodiment of a wireless network in a common cellular telecommunication configuration, having a series of group communication computer devices, such as application server 32 that controls communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of application servers 32 are connected to an application server LAN 50. Wireless telephones can request packet data sessions from the application server(s) 32 using a data service option. Also shown on LAN 50 is online charging system 36/application system 36.

The application server 32 is connected to a wireless service provider's packet data service node (PDSN), such as PDSN 52, and/or a broadcast serving node (BSN) 53, shown here resident as on a carrier network 54. The PDSN 52 and BSN 53 with the associated base stations 60 can constitute a regional communication system (e.g., an access network or radio access network), and may further include other server side 50 components, that will collectively control communications to the wireless communication devices 70,72,74,76 for a geographical or virtual region. Each PDSN 52 or BSN 53 can interface with a base station controller 64 of a base station 60 through a packet control function (PCF) 62. The PCF 62 is typically located in the base station 60. The carrier network 54 controls messages (generally in the form of data packets) sent to a mobile switching center ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the base transceiver station (sometimes referred to as "branch-to-source") (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication session. However, all such group-direct communication sessions may be 'server-arbitrated', which means that the communication sessions occur through, or be at the control of, the application server 32. Each data packet of the devices does not necessarily have to travel through the application server 32 itself, but the application server 32 may be able to ultimately control the communication session because the application server 32 will typically be the only server-side 30 component that is aware of and/or can retrieve the identity of the members of the communication group, or direct the identity of the members of the communication group 12 to another computer device.

Figure 3:
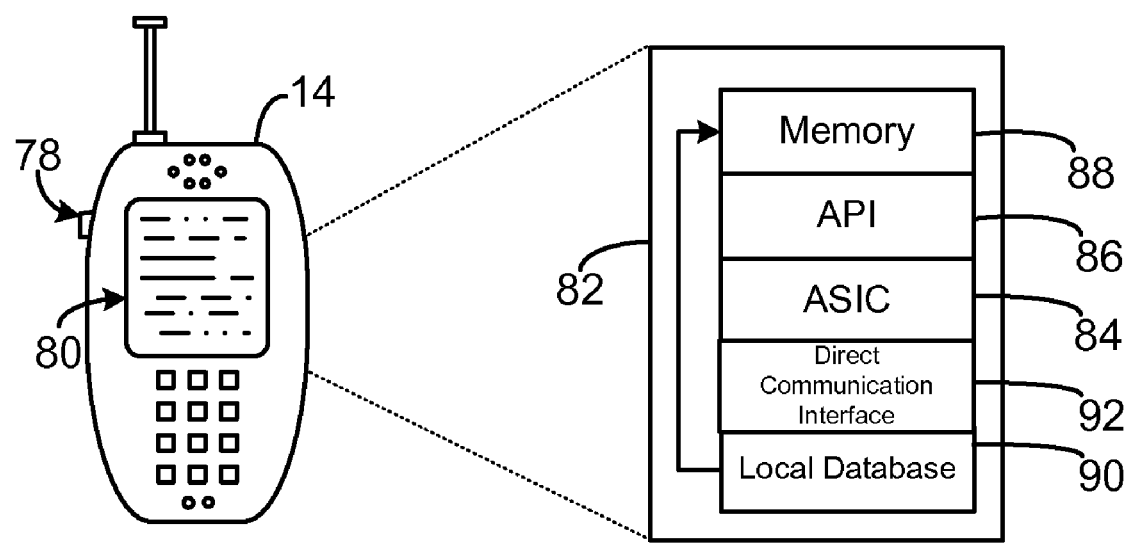
FIG. 3 is a block diagram illustrating the computer platform of the wireless telecommunication device with PTT capability.

FIG. 3 is a block diagram illustrating a wireless telecommunications device 14 (e.g., a mobile telephone) according to an embodiment of the invention. Referring to FIG. 3, the wireless telecommunications device 14 includes a PTT button 78 that is configured to open a direct communication to a target set of devices (e.g., other members of the communication group 12). The wireless device 14 is also shown as having a graphics display 80 to the user of the wireless device 14. The wireless device 14 includes a computer platform 82 that can handle voice and data packets, and receive and execute software applications transmitted across the wireless network 20 to include the group communications. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and may not normally be upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, while the wireless device 14 can be a mobile telephone with a graphics display 80, in alternative embodiments the wireless device can correspond to any type of wireless device with a computer platform 82 as known in the art, such as a personal digital assistant (PDA), a pager with a graphics display, or even a separate computer platform that has a wireless communication portal, and may otherwise have a wired connection to a network or the Internet. Further, the memory 88 can include read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

In an embodiment of the wireless communication device 14 of FIG. 3, the computer platform 82 also includes a direct communication interface 92 that can open the direct communication channel from the wireless device (e.g., for a half-duplex voice communication in a PTT call). The direct communication interface 92 may also be part of the standard communication interface for the wireless device which ordinarily carries the voice and data transmitted to and from the wireless device. The direct communication interface 92 typically includes hardware as is known in the art.

Figure 4:
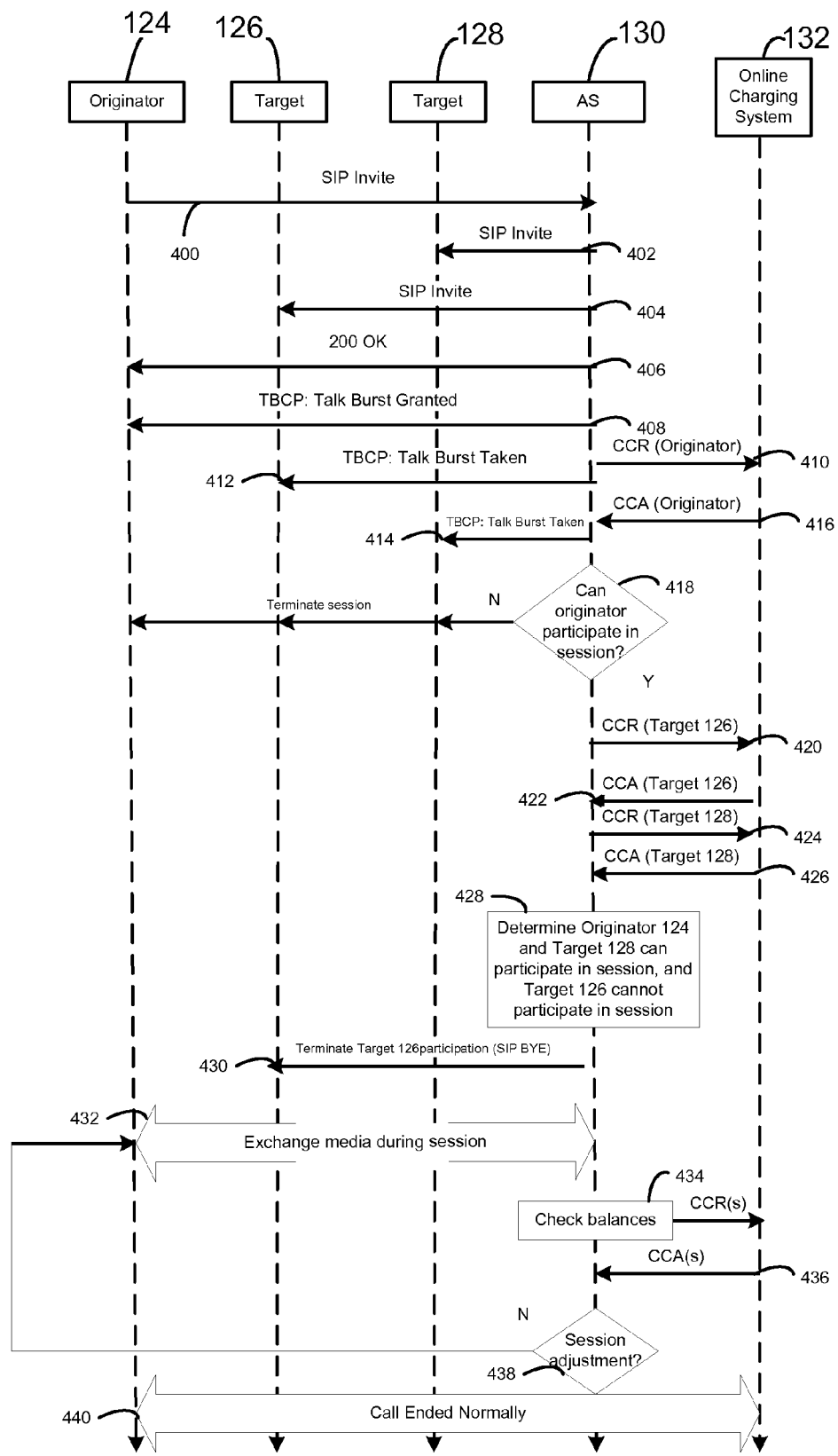
FIG. 4 is a call-flow diagram illustrating a process of setting up a server-arbitrated communication session among a plurality of pre-paid PTT wireless communication devices using session initiation protocol (SIP) in accordance with an embodiment of the invention.

FIG. 4 is a call-flow diagram illustrating a process of setting up a server-arbitrated communication session among a plurality of pre-paid PTT wireless communication devices using session initiation protocol (SIP) in accordance with an embodiment of the invention.

Referring to FIG. 4, a session originator 124 sends a call request message to the access network, which then forwards the call request message to the application server 130, 400. As shown in FIG. 4, in a SIP call set-up implementation, the call request message may correspond to a SIP invite message. Upon receiving the call request message from the session originator 124, the application server 130 identifies the call targets for the session, and then announces the group communication session to target users 126 and 128, 402 and 404. As shown in FIG. 4, in a SIP call set-up implementation, the call announcement messages may correspond to SIP invite messages.

After the application server 130 receives the call request message from the session originator 124, the application server 130 acknowledges receipt of the call request message, 406. As shown in FIG. 4, in a SIP call set-up implementation, the call message acknowledgment may correspond to a 200 OK message. Then, after the application server 130 receives a message from a first target device that indicates acceptance of the announced group communication session (i.e., a "first responder"), the application server 130 sends a status message to the session originator 124 that indicates that the session originator 124 can begin buffering and/or sending media for the session to the application server 130 to be forwarded to one or more call targets that have joined the session, 408. As shown in FIG. 4, in a SIP call set-up implementation, the status message may correspond to a talk burst control protocol (TBCP) Talk Burst Granted message, which functions to grant the session originator 124 floor-holder status for the session.

As will be appreciated, in FIG. 4, upon receiving the call request message in 400, the application server 130 does not wait for credit authorization of the session originator 124 before announcing the session (e.g., 402 and 404) and/or granting the floor to the session originator 124 (e.g., 408). Thus, it will be appreciated that the pre-paid group communication session of FIG. 4 can be set-up more quickly than conventional pre-paid group communication sessions for at least this reason, because conventional prepaid group communication sessions wait for balance-verification before call announcement. However, it is of course still important to verify that the session originator, as well as the targets to the session, can actually afford to participate in the pre-paid group communication session.

Accordingly, the application server 130 sends a credit control request (CCR) for the session originator 124 to an online charging system (OCS) 132, 410, and waits to receive a credit control answer (CCA) for the session originator 124 from the OCS 132 while continuing to setup the prepaid group communication session. The OCS 132 is well-known in the art, and is configured to manage account balances, including prepaid account balances, for subscribers within the wireless communications system 10, and further to report these balances upon request to network entities such as the application server 32 or 130. Thus, while waiting for the CCR response, the application server 130 sends a message to the call targets 126 and 128, 412 and 414, indicating that the session originator 124 has been granted the floor and is going to begin forwarding media associated with the prepaid group communication session. As shown in FIG. 4, in a SIP call-setup implementation, the message sent to session target 126 in 412 and/or the message sent to session target 128 in 414 may each correspond to a talk burst control protocol (TBCP) Talk Burst Taken message.

Accordingly, after block 414, the prepaid group communication session between the session originator 124 and the call targets 126 and 128 is setup (e.g., although it is appreciated that all messaging associated with setting up the prepaid group communication session is not necessarily shown in FIG. 4, e.g., a contact message (not shown) may be sent to each session participant so that each session participant knows how to contact a server hosting the actual exchange of media at the application server 130, etc.). However, the session participants have not yet been verified as having a sufficient balance (e.g., a funds or cash balance, a credit balance, etc.) to participate in the prepaid group communication session. Thus, in response to the CCR for the session originator 124 (e.g., which requests whether the session originator 124 has a sufficient available balance to place the call) from 410, the OCS 132 sends a CCA to the application server 130 that is indicative of whether the session originator 124 has a sufficient balance to initiate and/or participate in the prepaid group communication session, 416.

Upon receiving the CCA for the session originator 124, the application server 130 determines whether the session originator 124 has a balance sufficient to participate in the prepaid group communication session, 418. In an example, the verification of the session originator's balance can occur before verification of the balances of the call targets because an inadequate balance of the session originator may result in immediate termination of the entire session, in contrast with a mere dropping of individual call targets that have insufficient balances while permitting the remaining parties to continue with the prepaid group communication session. In a further example, if the decision block 418 determines to terminate the prepaid group communication session due to inadequate funds and/or credit on the part of the session originator 124, the session originator 124 may be sent a message indicating that its balance is low and to refrain from subsequent session initiation requests at least until his/her balance is replenished.

Alternatively, it is also possible that the CCRs for each potential call participant (e.g., both session originator 124 and session targets 126 and/or 128) are bundled together, and the responsive CCAs are also bundled together, such that the CCRs are requested by the application server 130 concurrently, and the CCAs are received at the application server 130 concurrently. Thus, the decision block of 418 need not occur before the CCAs for call targets are evaluated in other embodiments of the invention, but can rather occur concurrently or in parallel.

In another embodiment, the application server 130 may allow the call to proceed even if the decision block 418 determines the session originator 124 has an insufficient balance (i.e., a balance that is below a given threshold level). In this alternative embodiment, the OCS 132 may be instructed to debit the session originator's 124 client account after termination of the call (e.g., which means that this is a post-paid call for the session originator 124, although the call is still 'prepaid' from the perspective of the session targets 126 and/or 128). In a further embodiment, after a 'postpaid' session for the session originator 124 resulting from the originator having an insufficient balance, the session originator 124 may be unable to initiate another session until the available balance has been raised above a threshold level. In an example, the session originator 124 may be sent a message that informs the originator of the low-balance status. In other words, during a first instance in which the session originator 124 has an insufficient balance, the call may be permitted to continue and an attempt to bill the originator can be performed after call termination. This first instance thereby acts as a warning to the originator, and puts a user thereof on notice that his/her funds require replenishment (e.g., after a message is sent to the originator that informs the originator of his/her low balance). If the originator fails to replenish his/her funds, future call origination attempts by the same user will be denied until his/her funds are replenished.

Returning to FIG. 4, assume that the session originator 124 has a sufficient balance (e.g., funds and/or credit) available, and as such the application server 130 sends, to the online charging system 132, a CCR for session target 126, 420, and session target 128, 424. Accordingly, the OCS 132 evaluates the account balances for the session targets 126 and 128, and sends a CCA for each of the session targets 126 and 128 to the application server 130, 422 and 426. Again, in an alternative embodiment, the CCRs and/or CCAs for the session participants can be bundled together to reduce signaling between the application server 130 and the OCS 132.

Next, the application server 130 evaluates the CCA for each call target (e.g., in this case, session targets 126 and 128) and determines whether one or more session targets can participate in the call, 428. In an example, while not shown in FIG. 4, if no call targets are permitted to participate in the prepaid group communication session, the entire session can be terminated. In another example, while not shown in FIG. 4, if each call target is permitted to participate in the prepaid group communication session, the session continues in an unrestricted fashion (e.g., although the application server 130 can still track the balances of the session participants to ensure that the respective balances do not become overdrawn, as discussed below with respect to 434 through 438). In a further example, if at least one and less than all call target are permitted to participate in the call based on the CCAs received from the OCS 132, then only the call targets without the sufficient account balance are restricted or blocked from the prepaid group communication session.

Referring to FIG. 4, for convenience of explanation, assume that the application server 130 determines that the session originator 124 and the session target 128 are permitted to participate in the prepaid group communication session, and that the session target 126 is not permitted to participate in the prepaid group communication session, 428. Accordingly, the session target 126 is dropped from the prepaid group communication session in 430. As shown in FIG. 4, in a SIP call set-up implementation, the session target 126 is dropped from the prepaid group communication session by sending the session target 126 a SIP BYE message.

Next, in 432, the remaining call participants (e.g., the session originator 124 and the session target 128) engage in the prepaid group communication session such that media (e.g., voice, video, etc.) is exchanged between the remaining call participants. During the prepaid group communication session, the application server 130 may perform a 'quota control procedure'. In other words, the application server 130 may (i) periodically confirm that the active session participants (e.g., session originator 124 and session target 128) continue to have a sufficient balances for call participation, and/or (ii) periodically confirm that any inactive call participants that were dropped due to an insufficient balance (e.g., call target 126 in 430) continue to have an insufficient balance. Thus, the application server 130 sends one or more CCRs to the OCS 132 to check the balances of the group members, 434, and the OCS 132 responds with CCAs indicative of whether the group members have sufficient balances for call participation, 436.

Based on the CCAs received in 436, the application server 130 determines whether to adjust the prepaid group communication session, 438. For example, if the CCAs from 436 indicate that a balance of one or more active call participants has fallen below a threshold level and is now insufficient for call participation, those call participants may be dropped from the session. In an example, if the remaining number of call participants is below a threshold level, or one of the dropped call participants is the session originator 124 and/or the current floorholder, the entire session can be terminated (e.g., if the originator's balance becomes insufficient the call cannot continue, if only one participant remains with a sufficient balance the session cannot continue, etc.). In another example, if the CCAs from 436 indicate that a balance of one or more previously dropped call participants is greater than or equal to the threshold level and is now sufficient for call participation, the previously dropped call participant(s) may be invited to re-join the session. Otherwise, if no adjustments to the session participation are determined to be necessary in 438, the process advances to 432 and the call continues. At some later point in time, the prepaid group communication session ends, 440.

As will be appreciated by one of ordinary skill in the art, the application server 130 need not wait for explicit credit authorization before initiating setup for a delay-sensitive server-arbitrated prepaid group communication session. Rather, the prepaid session can be setup concurrently with credit approval, such that setup latency is reduced in the event that credit approval is obtained successfully. In the case that credit approval is denied for the prepaid session or for individual session participants, the prepaid session can either be terminated, or the deficient session participant(s) can be selectively dropped from the session.

Further, while above-described examples of prepaid group communication sessions are primarily given as half-duplex PTT sessions, it will be appreciated that other embodiments can be directed to any server-arbitrated group communication session (e.g., VoIP, a full-duplex session, a PTX session, etc.).

Further, while above-described embodiments of the invention include references to prepaid group communication sessions generally, it will be appreciated that the group communication sessions referred to herein can correspond to multicast sessions or group calls supported by IP multicasting protocols (e.g., one or more sectors transmits messaging on a downlink shared channel intended to be decoded, potentially, by multiple access terminals (ATs) in the sector), and/or group calls supported by IP unicasting protocols (e.g., each registered group member receives unicast messaging for the group session that is specifically intended for one particular group member). Thus, the above-described embodiments are compatible with either scenario or a combination thereof (e.g., where the same group session supports one or more ATs via IP unicast and one or more other ATs via IP multicast).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes computer storage media, including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing a prepaid server-arbitrated group communication session within a wireless communications system, comprising:
    receiving, from a session originator, a request to setup a prepaid group communication session with at least one session target, the prepaid group communication session requiring each session participant to have an available prepaid account balance above a threshold level;
    sending a query to an online charging system to determine whether at least the session originator has a prepaid account with an available balance at least equal to the threshold level;
    sending at least one additional query to the online charging system to determine whether the at least one session target has a prepaid account with an available balance at least equal to the threshold level, wherein initiating setup of the requested prepaid group communication session continues without waiting to receive a response to the at least one additional query, wherein the query and the at least one additional query are bundled within the same message;
    initiating setup of the requested prepaid group communication session without waiting to receive a response to either the query or the at least one additional query;
    receiving a query response from the online charging system indicating the available balance of the prepaid account for at least the session originator after initiating setup of the requested prepaid group communication session; and
    receiving at least one additional query response from the online charging system indicating the available balance of the prepaid account for at least one target after initiating setup of the requested prepaid group communication session.

2. The method of claim 1, further comprising:
    sending a message to the session originator requesting that the session initiator refrain from requesting initiation of subsequent prepaid group communication sessions at least until the available balance of the prepaid account for the session originator is at least equal to the threshold level.

3. The method of claim 1, further comprising:
in response to the query response, permitting the prepaid group communication session to continue if the available balance of the prepaid account for the session originator was at least equal to the threshold level during a preceding prepaid group communication session.

4. The method of claim 1, wherein terminating the prepaid group communication session at least for the at least one session target terminates the prepaid group communication session entirely if the at least one query response indicates that no session target has an available balance of an associated prepaid account at least equal to the threshold level.

5. The method of claim 1, wherein the terminating the prepaid group communication session comprises terminating the prepaid group communication session only for individual session targets with account balances of associated prepaid accounts lower than the threshold level if one or more session targets among the at least one session target has an available balance of an associated prepaid account at least equal to the threshold level.

6. The method of claim 1, wherein the prepaid group communication session corresponds to at least one of a half-duplex session, a full-duplex session, a push-to-talk (PTT) session, a push-to-transfer (PTX) session and a Voice-over-Internet Protocol (VoIP) session.

7. The method of claim 1, wherein the initiating setup of the requested prepaid group communication session is initiated in accordance with a session initiation protocol (SIP), wherein the received request corresponds to a SIP invite message, and wherein the query corresponds to a credit control request (CCR) message.

8. A server configured to arbitrate group communication sessions within a wireless communications system, comprising:
means for receiving, from a session originator, a request to setup a prepaid group communication session with at least one session target, the prepaid group communication session requiring each session participant to have an available prepaid account balance above a threshold level;
means for sending a query to an online charging system to determine whether at least the session originator has a prepaid account with an available balance at least equal to the threshold level;
means for sending at least one additional query to the online charging system to determine whether the at least one session target has a prepaid account with an available balance at least equal to the threshold level, wherein initiating setup of the requested prepaid group communication session continues without waiting to receive a response to the at least one additional query, wherein the query and the at least one additional query are bundled within the same message;
means for initiating setup of the requested prepaid group communication session without waiting to receive a response to either the query or the at least one additional query;
means for receiving a query response from the online charging system indicating the available balance of the prepaid account for at least the session originator after the setup of the requested prepaid group communication session has been initiated; and
means for receiving at least one additional query response from the online charging system indicating the available balance of the prepaid account for at least one target after initiating setup of the requested prepaid group communication session.

9. A server configured to arbitrate group communication sessions within a wireless communications system, comprising:
a network interface; and
a processor coupled to the network interface and configured with processor-executable instructions configured to perform operations comprising:
receiving, from a session originator, a request to setup a prepaid group communication session with at least one session target, the prepaid group communication session requiring each session participant to have an available prepaid account balance above a threshold level;
sending a query to an online charging system to determine whether at least the session originator has a prepaid account with an available balance at least equal to the threshold level;
sending at least one additional query to the online charging system to determine whether the at least one session target has a prepaid account with an available balance at least equal to the threshold level, wherein initiating setup of the requested prepaid group communication session continues without waiting to receive a response to the at least one additional query, wherein the query and the at least one additional query are bundled within the same message;
initiating setup of the requested prepaid group communication session without waiting to receive a response to the query and the additional query;
receiving a query response from the online charging system indicating the available balance of the prepaid account for at least the session originator after setup of the requested prepaid group communication session has been initiated; and
receiving at least one additional query response from the online charging system indicating the available balance of the prepaid account for at least one target after setup of the requested prepaid group communication session has been initiated.

10. A non-transitory computer-readable storage medium having stored thereon processor-executable instructions configured to cause a processor to arbitrate group communication sessions within a wireless communications system by causing the processor to perform operations comprising:
receiving, from a session originator, a request to setup a prepaid group communication session with at least one session target, the prepaid group communication session requiring each session participant to have an available prepaid account balance above a threshold level;
sending a query to an online charging system to determine whether at least the session originator has a prepaid account with an available balance at least equal to the threshold level;
sending at least one additional query to the online charging system to determine whether the at least one session target has a prepaid account with an available balance at least equal to the threshold level, wherein initiating setup of the requested prepaid group communication session continues without waiting to receive a response to the at least one additional query, wherein the query and the at least one additional query are bundled within the same message;
initiating setup of the requested prepaid group communication session without waiting to receive a response to either the query or the at least one additional query;
receiving a query response from the online charging system indicating the available balance of the prepaid account for at least the session originator after initiating setup of the requested prepaid group communication session; and receiving at least one additional query response from the online charging system indicating the available balance of the prepaid account for at least one target after initiating setup of the requested prepaid group communication session.

11. The method of claim 1, further comprising:
terminating the prepaid group communication session if the available balance for the session originator is below the threshold level.

12. The server of claim 8, further comprising:
means for terminating the prepaid group communication session if the available balance for the session originator is below the threshold level.

13. The server of claim 9, further comprising:
terminating the prepaid group communication session if the available balance for the session originator is below the threshold level.

14. The non-transitory computer-readable storage medium of claim 10 wherein the stored processor-executable instructions are configured to cause a processor to perform operations further comprising:
terminating the prepaid group communication session if the available balance for the session originator is below the threshold level.

15. The method of claim 1, further comprising:
terminating the prepaid group communication session if the query response from the online charging system indicates that the available balance of the prepaid account for the session originator is below the threshold level.

16. The method of claim 1, further comprising:
terminating the prepaid group communication session at least for the at least one session target if the additional query response from the online charging system indicates that the available balance of the prepaid account for the at least one session target is below the threshold level.

17. The server of claim 8, further comprising:
means for terminating the prepaid group communication session if the query response from the online charging system indicates that the available balance of the prepaid account for the session originator is below the threshold level.

18. The server of claim 8, further comprising:
means for terminating the prepaid group communication session at least for the at least one session target if the additional query response from the online charging system indicates that the available balance of the prepaid account for the at least one session target is below the threshold level.

19. The server of claim 9, wherein the processor is configured with processor-executable instructions configured to perform operations further comprising:
terminating the prepaid group communication session if the query response from the online charging system indicates that the available balance of the prepaid account for the session originator is below the threshold level.

20. The server of claim 9, wherein the processor is configured with processor-executable instructions configured to perform operations further comprising:
terminating the prepaid group communication session at least for the at least one session target if the additional query response from the online charging system indicates that the available balance of the prepaid account for the at least one session target is below the threshold level.

21. The non-transitory computer-readable storage medium of claim 10, wherein the stored processor-executable instructions are configured to cause the processor to perform operations further comprising:
terminating the prepaid group communication session if the query response from the online charging system indicates that the available balance of the prepaid account for the session originator is below the threshold level.

22. The non-transitory computer-readable storage medium of claim 10, wherein the stored processor-executable instructions are configured to cause the processor to perform operations further comprising:
terminating the prepaid group communication session at least for the at least one session target if the additional query response from the online charging system indicates that the available balance of the prepaid account for the at least one session target is below the threshold level.

23. A method of managing a prepaid server-arbitrated group communication session among session participants comprising a session originator and at least two session targets within a wireless communications system, the method comprising:
receiving, from the session originator, a request to setup a prepaid group communication session with at least two session targets, the prepaid group communication session requiring each session participant to have an available prepaid account balance above a threshold level;
sending a query to an online charging system to determine whether at least the session originator has a prepaid account with an available balance at least equal to the threshold level;
initiating setup of the requested prepaid group communication session without waiting to receive a response to the query;
sending at least one additional query to the online charging system to determine whether the at least two session targets each have a prepaid account with an available balance at least equal to the threshold level, wherein initiating setup of the requested prepaid group communication session continues without waiting to receive a response to the at least one additional query;
receiving a query response from the online charging system indicating the available balance of the prepaid account for at least the session originator after initiating setup of the requested prepaid group communication session;
receiving at least one additional query response from the online charging system indicating the available balance of the prepaid account for at least one target after initiating setup of the requested prepaid group communication session;
terminating the prepaid group communication session if the query response from the online charging system indicates that the available balance of the prepaid account for the session originator is below the threshold level; and
terminating the prepaid group communication session at least for the at least one session target if the additional query response from the online charging system indicates that the available balance of the prepaid account for the at least one session target is below the threshold level.

24. A server configured to arbitrate group communication sessions among session participants comprising a session originator and at least two session targets within a wireless communications system, comprising:
- means for receiving, from the session originator, a request to setup a prepaid group communication session with at least two session targets, the prepaid group communication session requiring each session participant to have an available prepaid account balance above a threshold level;
- means for sending a query to an online charging system to determine whether at least the session originator has a prepaid account with an available balance at least equal to the threshold level;
- means for initiating setup of the requested prepaid group communication session without waiting to receive a response to the query;
- means for sending at least one additional query to the online charging system to determine whether the at least two session targets each have a prepaid account with an available balance at least equal to the threshold level with setup of the requested prepaid group communication session continuing without waiting to receive a response to the at least one additional query;
- means for receiving a query response from the online charging system indicating the available balance of the prepaid account for at least the session originator after the setup of the requested prepaid group communication session has been initiated;
- means for receiving at least one additional query response from the online charging system indicating the available balance of the prepaid account for at least one target after initiating setup of the requested prepaid group communication session;
- means for terminating the prepaid group communication session if the query response from the online charging system indicates that the available balance of the prepaid account for the session originator is below the threshold level; and
- means for terminating the prepaid group communication session at least for the at least one session target if the additional query response from the online charging system indicates that the available balance of the prepaid account for the at least one session target is below the threshold level.

25. A server configured to arbitrate group communication sessions among session participants comprising a session originator and at least two session targets within a wireless communications system, comprising:
- a network interface; and
- a processor coupled to the network interface and configured with processor-executable instructions configured to perform operations comprising:
  - receiving, from the session originator, a request to setup a prepaid group communication session with at least two session targets, the prepaid group communication session requiring each session participant to have an available prepaid account balance above a threshold level;
  - sending a query to an online charging system to determine whether at least the session originator has a prepaid account with an available balance at least equal to the threshold level;
  - initiating setup of the requested prepaid group communication session without waiting to receive a response to the query;
  - sending at least one additional query to the online charging system to determine whether the at least two session targets each have a prepaid account with an available balance at least equal to the threshold level with setup of the requested prepaid group communication session continuing without waiting to receive a response to the at least one additional query;
  - receiving a query response from the online charging system indicating the available balance of the prepaid account for at least the session originator after setup of the requested prepaid group communication session has been initiated;
  - receiving at least one additional query response from the online charging system indicating the available balance of the prepaid account for the at least one target after setup of the requested prepaid group communication session has been initiated;
  - terminating the prepaid group communication session if the query response from the online charging system indicates that the available balance of the prepaid account for the session originator is below the threshold level; and
  - terminating the prepaid group communication session at least for at least one session target if the additional query response from the online charging system indicates that the available balance of the prepaid account for the at least one session target is below the threshold level.

26. A non-transitory computer-readable storage medium having stored thereon processor executable instructions configured to cause a processor to arbitrate group communication sessions among session participants comprising a session originator and at least two session targets within a wireless communications system by causing the processor to perform operations comprising:
- receiving, from the session originator, a request to setup a prepaid group communication session for synchronous communication with at least two session targets, the prepaid group communication session requiring each session participant to have an available prepaid account balance above a threshold level;
- sending a query to an online charging system to determine whether at least the session originator has a prepaid account with an available balance at least equal to the threshold level;
- initiating setup of the requested prepaid group communication session without waiting to receive a response to the query;
- sending at least one additional query to the online charging system to determine whether the at least two session targets each have a prepaid account with an available balance at least equal to the threshold level while setup of the requested prepaid group communication session continues without waiting to receive a response to the at least one additional query;
- receiving a query response from the online charging system indicating the available balance of the prepaid account for at least the session originator after initiating setup of the requested prepaid group communication session;
- receiving at least one additional query response from the online charging system indicating the available balance of the prepaid account for at least one target after initiating setup of the requested prepaid group communication session;
- terminating the prepaid group communication session if the query response from the online charging system indicates that the available balance of the prepaid account for the session originator is below the threshold level; and terminating the prepaid group communication session at least for the at least one session target if the additional query response from the online charging system indicates that the available balance of the prepaid account for the at least one session target is below the threshold level.

* * * * *